Feb. 20, 1951 L. W. MAHLE 2,542,691
CONFECTIONERY EXTRUDING APPARATUS
Original Filed Feb. 16, 1948

Inventor:
LOUIS WILLIAM MAHLE,

By *James M. Gans*
Attorney

Patented Feb. 20, 1951

2,542,691

UNITED STATES PATENT OFFICE 2,542,691

CONFECTIONERY EXTRUDING APPARATUS

Louis William Mahle, Abington, Pa., assignor to Frank H. Fleer Corporation, Philadelphia, Pa., a corporation of Delaware Original application February 16, 1948, Serial No. 8,539. Divided and this application August 9, 1949, Serial No. 109,250

2 Claims. (Cl. 107—14)

This invention relates to a new and improved extrusion apparatus for plastics and more particularly to an extruder for use in forming layers of confectionery material, such as chewing gum, candy and the like.

While not in any way limited thereto, the extruder of the present invention is particularly useful in the preparation of laminated chewing gum and candy products of the general type shown in co-pending application Serial No. 8,539, filed February 16, 1948, entitled Chewing Gum Manufacture, of which the present application is a division.

In the aforesaid parent application there is described and claimed, among other things, a process and apparatus for the preparation of a laminated chewing gum product or "sandwich" in which two spaced layers of chewing gum are continuously extruded under pressure from a single extruder, a single layer of candy continuously extruded therebetween from an extruder positioned between the two advancing spaced layers of chewing gum, and then the three layers joined one to the other to form a laminated sheet product, which is processed and cut to form individual sticks of laminated chewing gum.

In forming a laminate of the foregoing character, the difficulty attending the continuous extrusion of the intermediate layer of candy is readily apparent. Employing an extruder of conventional design, fed from the top-center, and positioning such an extruder between the advancing gum strips, requires that the operator reach in between the advancing gum strips in order to feed candy into the hopper of the extruder. Obviously, this is a precarious and dangerous undertaking and an unsanitary one, to say the least, because it is almost impossible to feed the candy hopper without the operator coming into contact with the advancing chewing gum layers.

It is accordingly one of the objects of the present invention to provide an extremely simple extruder unit of the foregoing character which may be conveniently employed to furnish a continuously advancing, intermediate strip of confectionery material, such as candy, between two continuously advancing strips of chewing gum.

It is a further object to provide an extruder of this character which will obviate the necessity of the operator reaching in between the advancing chewing gum layers in order to feed candy into the hopper of the extruder providing the intermediate candy layer.

It is a further object to provide an extruder of this character wherein confectionery or other material forming an intermediate lamina or layer may be fed into spaced, opposed hoppers positioned entirely outside the running confines of the advancing upper and lower layers of the laminate.

The extruder of the present invention reduces the mechanical equipment required for carrying the upper sheet to the point of lamination and makes the intermediate extruder of the present invention accessible for repairs and cleaning. Cleaning is an important part of every run, for sanitary reasons and to remove material which would become brittle if left there.

Reference is now had to the accompanying drawing, in which like reference characters denote like parts and in which.

Figure 1:
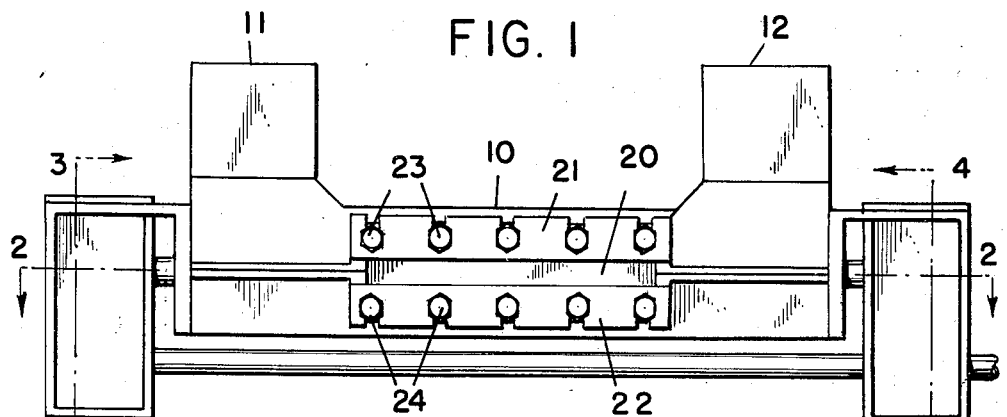
Fig. 1 is a front elevation of the extruder of the present invention.
Figure 2:
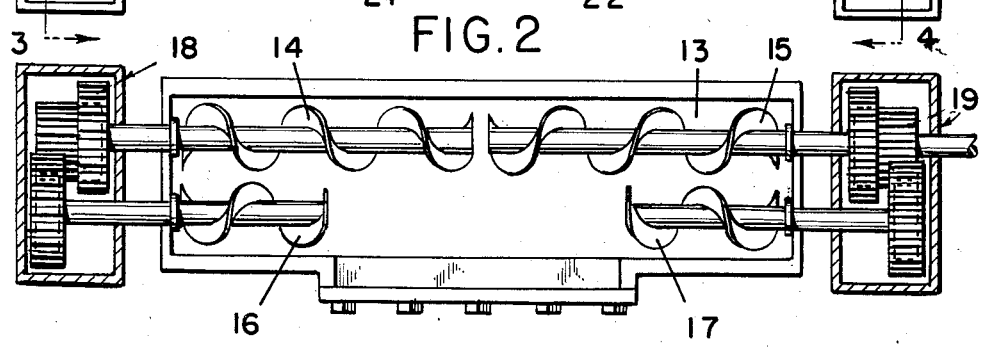
Fig. 2 is a longitudinal section, partly in section, taken on line 2—2 of Fig. 1.
Figure 3:
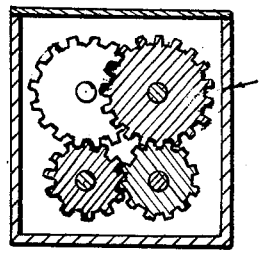
Fig. 3 is a section taken along line 3—3 of Fig. 1.
Figure 4:
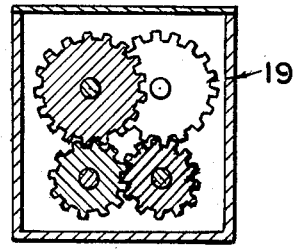
Fig. 4 is a section taken along line 4—4 of Fig. 1.

Referring now to Figs. 1 and 2, the extruder which is designated generally at 10, is made up of two identical, spaced hoppers 11 and 12 through which the candy, gum or confectionery is fed manually. The candy falls into a longitudinally disposed extruding chamber 13 by gravity and is forced to the center thereof, from each end by two sets of opposed screws or worms. As shown in Fig. 2, these sets are made up of rearwardly disposed worms 14 and 15 and forwardly disposed worms 16 and 17. Both sets of opposed worms are driven from appropriate gear boxes 18 and 19. The gearing shown more or less schematically in these gear boxes and in Figs. 3 and 4 is of conventional type and no claim is made thereto. Intermediate the hoppers 11 and 12 is an orifice 20 parallel to the axes of the sets of worms and provided with vertically adjustable plates 21 and 22. The size of the orifice is varied at will by sliding the plates 21 and 22 upwardly or downwardly and holding them in place by a series of bolts 23 and 24. Worms 16 and 17 are shorter, of course, than worms 14 and 15, so that the compressed candy may have free and unimpeded access to orifice 20, and to equalize pressure on all sides of the mass so that a space is obtained behind the orifice plates in which the material is under equal pressure throughout, so that a uniformly thick sheet is extruded. When the extruder is employed in making up laminates of the foregoing character, orifice 20 is positioned between and directly in line with the two advancing upper and lower sheets with which the sheet emanating from orifice 20 is to be laminated.

By virtue of the particular construction of this extruder, whereby confectionery may be fed into both ends thereof, is propelled from both ends of the extrusion chamber 10 to the center thereof and is then forced out at right angles to the extrusion chamber 10 and the worms working therein, it is possible to position this extruder, when employed to form an intermediate layer in a laminate, without the necessity of spreading apart advancing upper and lower layers an inordinate distance one from the other. By employing the extruder of the present invention, in other words, it is possible to feed confectionery material into hoppers 11 and 12 with great facility from both sides of advancing upper and lower layers of chewing gum without interfering in any way with the passage of the two layers of chewing gum. Stated differently, since hoppers 11 and 12 are positioned on either side of the advancing strips of materials to which the intermediate layer is to be laminated, the operator need not reach in between the gum strips for any reason.

What is claimed is:

1. An extrusion apparatus useful in forming strips of confectionery material and the like, comprising an extruding chamber, feed hoppers at each end of and communicating with said extruding chamber, an orifice slot in said extruding chamber and extending lengthwise thereof, vertically slidable plates for adjusting the width of the slot, screw means disposed in said extruding chamber parallel to said orifice slot and effective to force plastic from the ends of the chamber adjacent the hoppers towards the center of the chamber and thence through said orifice slot at right angles to said screw means, said screw means comprising two sets of opposed screws, one set rearwardly disposed and the other set forwardly disposed in said chamber adjacent said orifice slot.

2. An extrusion apparatus useful in forming strips of confectionery material and the like, comprising an extruding chamber, feed hoppers at each end of and communicating with said extruding chamber, an orifice slot in said extruding chamber and extending lengthwise thereof, vertically slidable plates for adjusting the width of the slot, screw means disposed in said extruding chamber parallel to said orifice slot and effective to force plastic from the ends of the chamber adjacent the hoppers towards the center of the chamber and thence through said orifice slot at right angles to said screw means, said screw means comprising two sets of opposed screws, one set rearwardly disposed in said chamber and the other set forwardly disposed in said chamber adjacent said orifice slot, said forwardly disposed screws being of shorter length than said rearwardly disposed screws so that compressed plastic may have unimpeded access to said orifice slot and the pressure on the plastic material equalized to obtain uniform extrusion.

LOUIS WILLIAM MAHLE.

REFERENCES CITED

The following references are of record in the file of this patent:

UNITED STATES PATENTS

| Number | Name | Date |
| --- | --- | --- |
| 1,350,722 | Goodenberger | Aug. 24, 1920 |

FOREIGN PATENTS

| Number | Country | Date |
| --- | --- | --- |
| 3,850 | Australia | Sept. 2, 1931 |